July 2, 1946.　　　W. P. LEAR　　　2,403,092
LINEAR ACTUATOR
Filed Feb. 19, 1943　　　2 Sheets-Sheet 1

INVENTOR.
William P. Lear
Richard A. Marsen
BY
his ATTORNEY

July 2, 1946.  W. P. LEAR  2,403,092
LINEAR ACTUATOR
Filed Feb. 19, 1943    2 Sheets-Sheet 2

INVENTOR.
William P. Lear
BY Richard A. Marsen
his ATTORNEY

Patented July 2, 1946

2,403,092

UNITED STATES PATENT OFFICE 2,403,092

LINEAR ACTUATOR

William P. Lear, Piqua, Ohio, assignor, by mesne assignments, to Lear, Incorporated, Grand Rapids, Mich., a corporation of Illinois Application February 19, 1943, Serial No. 476,436

14 Claims. (Cl. 74—424.8)

This invention relates to actuating mechanism and more particularly to a self-lubricating power driven screw jack for operating devices, such as aboard aircraft, and adapted to be mounted as a unit on the element to be operated.

In order to assure reliability of operation of a retractable landing gear, wing flaps, and other movable accessories on aircraft, without an undue increase in weight, it is necessary that the actuating mechanisms for these devices be relatively simple, foolproof, positive in operation, light in weight, compact, and sturdy in construction. Additionally, where an individual actuating mechanism is provided for each unit of a related group of devices, it is advantageous that in the event of failure of power to one mechanism, the affected unit may be operated by one of the other mechanism or may be actuated manually.

It is among the objects of my present invention to provide a simple, compact, reliable, positive acting actuating mechanism which is light in weight; to provide such a mechanism which may be mounted as a compact unit on the device to be operated; to provide such mechanism which is substantially fully enclosed and with protective means preventing the ingress of foreign matter into the operating parts of the mechanism; to provide such a mechanism including a lubricant reservoir and means automatically insuring the supply of lubricant to all operating parts; to provide power driven actuating mechanism with means whereby it may be driven by the power means for associated mechanism or be operated manually; and to provide a compact, substantially fully enclosed self-lubricating jack combined as a unit with power driving mechanism, that is adapted for mounting with the device to be actuated.

These and other objects of the invention will become apparent from the following description and accompanying drawings, in which.

Figure 1:
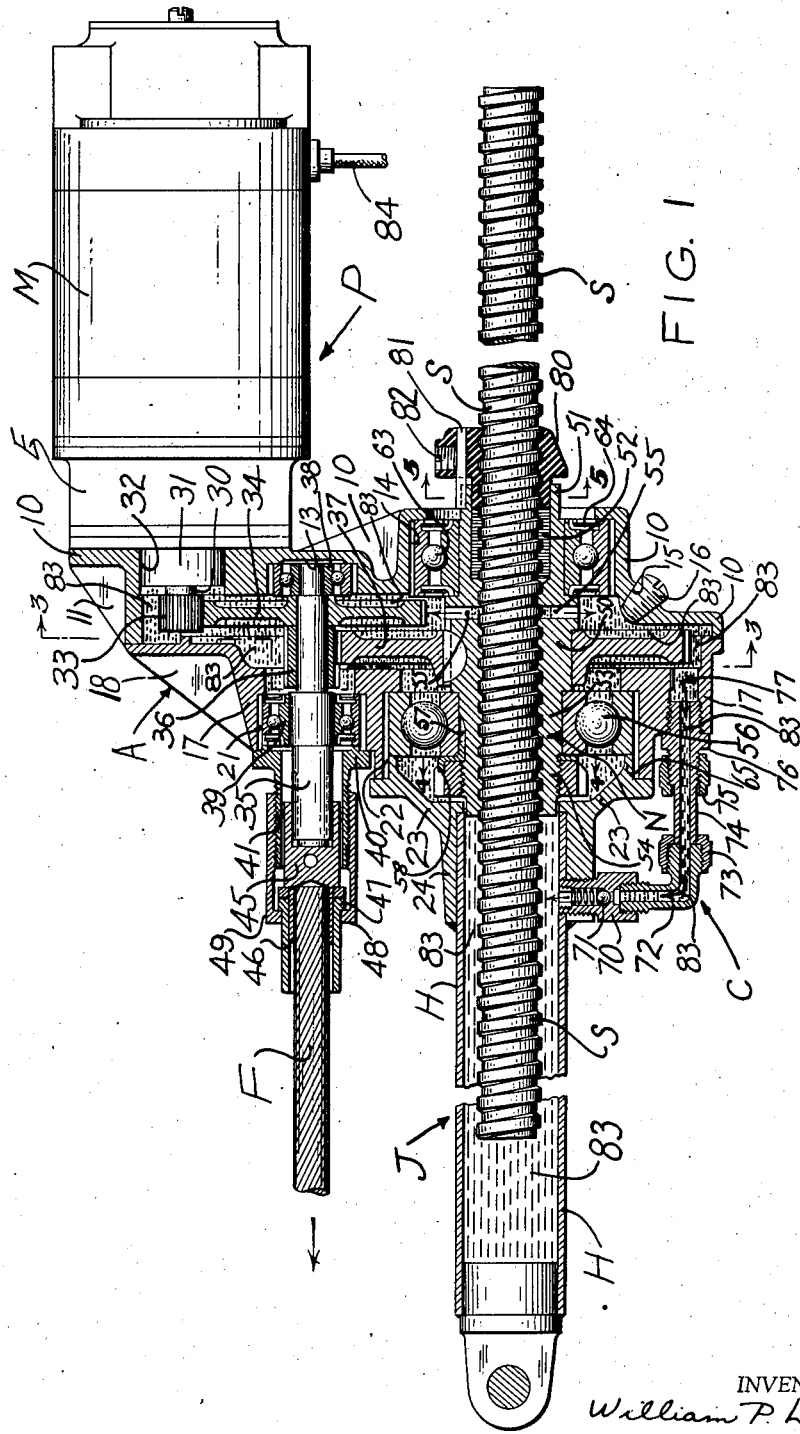
Fig. 1 is a side elevational view, partly in section, of a preferred embodiment of the principles of the invention.
Figure 2:
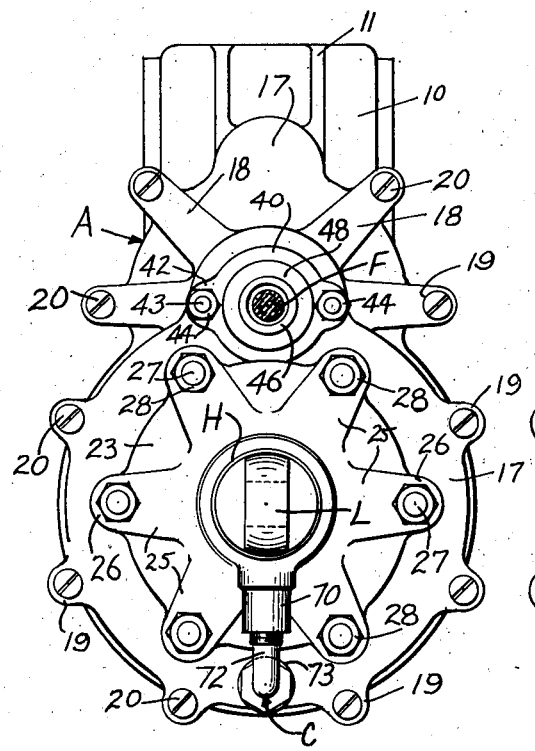
Fig. 2 is a left end elevational view of the embodiment of the invention shown in Fig. 1.
Figure 3:
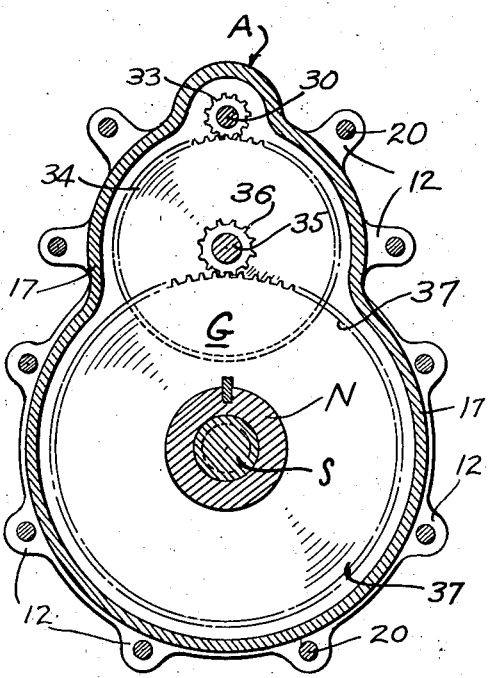
Fig. 3 is a sectional view on the line 3—3 of Fig. 1.
Figure 4:
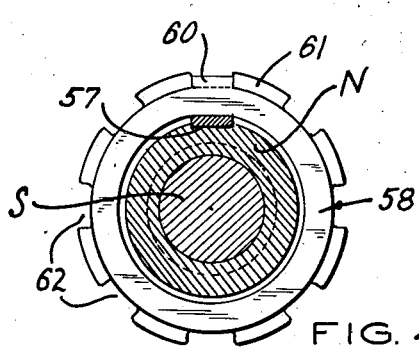
Fig. 4 is a sectional view on the line 4—4 of Fig. 1.
Figure 5:
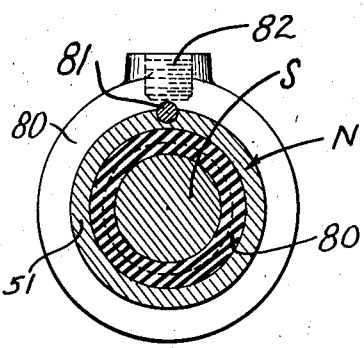
Fig. 5 is a sectional view on the line 5—5 of Fig. 1.

Generally speaking, the apparatus of the present invention comprises power driving means, such as an electric motor, actuating mechanism, such as a threaded shaft fixed against rotation and operatively associated with a rotatable nut, and gearing means whereby the driving means is connected to rotate the nut and thus advance and retract the threaded shaft. These elements are secured together to form a substantially fully enclosed unit which may be mounted on the device to be operated and includes a combined housing and lubricant reservoir for the shaft. Means are provided whereby lubricant may be forced, by operation of the apparatus, along the threads of the shaft and around the gearing means. To prevent loss of lubricant and ingress of foreign matter, a thread wiper or chaser is mounted on the threaded shaft. Means, such as a flexible shaft is secured to the gearing means to permit actuation by other power means or manually in the event of failure of the associated power driving means or electric motor.

Referring more particularly to the drawings, the illustrated embodiment of the invention comprises a self-lubricating jack J operated by power driving means P, such as an electric motor, through gearing G. The jack J includes a threaded shaft S, a rotatable nut N and a combined housing and lubricant reservoir H normally enclosing shaft S for substantially the full length of the shaft.

The power driving means P preferably is a unit of the type described and claimed in my U. S. Patent No. 2,267,114, issued December 23, 1941. As described in said patent, this unit includes a reversible electric motor M and a quick acting electromagnetic clutch E, which is engaged when the motor M is energized. The present invention is not limited to particular motor or clutch driving arrangements.

Gearing G is mounted in a housing A in which the rotatable nut N is mounted also. Housing A is secured to drive unit P and also to housing H of jack J, forming a compact device. The device of the invention may be secured to the device to be operated, such as retractable aircraft landing gear. Means, such as a conduit C, connects housing H to housing A whereby, as shaft J moves into housing H, lubricant is forced around nut N into housing A to lubricate the shaft S, nut N and gearing G. As shaft S is retracted from housing H, lubricant is sucked into said housing both around nut N and through the conduit C, which latter is provided with a check valve preventing reverse flow through the conduit. Thereby, the jack J is self-lubricating. Loss of lubricant is prevented by suitable packing and a thread wiper which also acts to clean foreign matter from the threads shaft S as it is drawn into housings A and H.

Gear housing A comprises an end wall 10 secured to the housing of unit P by suitable means and formed with reinforcing ribs 11 and ears or lugs 12. Additionally, wall or housing member 10 is formed with a small bearing recess 13, a large bearing recess 14, and a lubricant filler opening 15 closed by a removable plug 16.

A second wall or housing member 17 cooperates with wall 10 and is formed with ribs 18 and ears or lugs 19. Bolts and nuts 20 disposed in ears 12 and 19 unite wall 17 to wall 10. Wall 17 is formed with bearing recesses 21 and 22 cooperating with bearing recesses 13 and 14 for a purpose to be described.

A cover plate 23 closes recess 22 and is formed with a tubular extension 24 in which tubular housing H is secured in a suitable manner such as by brazing or welding. Plate 23 is formed with ribs 25 and lugs 26 receiving studs 27 in wall 17 to which plate 23 is united by nuts 28.

A shaft 30 extends from coupling member 31 of clutch E, which member is received in a recess 32 in wall 10. A pinion gear 33 is secured to shaft 31 and meshes with spur gear 34 mounted on a shaft 35. A pinion 36 is also fixed to shaft 35 and meshes with a spur gear 37 mounted on and keyed to rotatable nut N. One end of shaft 35 is mounted in roller bearing 38 in recess 13, and the shaft extends outwardly through roller bearing 39 in recess 21. Bearing assembly 39 is held in recess 21 by a cover plate 40 formed with a threaded tubular extension 41. Plate 40 is formed with ears 42 that receive studs 43 and nuts 44 securing plate 40 to wall 17. A coupling member 45 is keyed to the end of shaft 35 and also secured to flexible shaft F. Coupling 45 is surrounded by a sleeve 46 formed with a flange 47 engaged by a flange 48 on a closure member 49 secured to extension 41.

Rotatable nut N comprises an enlarged central section 50, a reduced right end section 51, a packing recess 52, a left hand bearing section 53 and a threaded left end section 54. Additionally, nut N is formed with radial apertures 55 providing lubricant passages communicating with screw shaft S. Spur gear 37 is keyed to the central section 50 of nut N. Roller bearing 56 is mounted on section 53 of nut N, which section is formed with a key-way 57.

Figure 6:
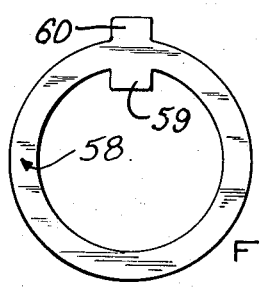
Fig. 6 is an elevational view of a locking member shown partly in section in Fig. 4.

To secure bearing 56 with nut N, a locking or latching washer 58 is provided, which is illustrated in Fig. 6. This washer is provided with opposing inner and outer tabs 59 and 60. Tab 59 is bent at right angles to washer 58 and fitted in key-way 57. A castellated nut 61 is then threaded on nut section 54 into tight engagement with bearing assembly 56 and tab 60 then is bent at right angles into one of the recesses 62 in nut 61.

A roller bearing 63 is mounted in recess 14 and is provided with lubricant seals 64. The rotatable nut N assembly is then mounted in the gearing housing A with its reduced section 51 extending through bearing 63 and is held in place by cover plate 23 which has an annular flange 65 engaging the outer race of bearing 56.

The means for lubricating the jack J includes conduit assembly C communicating with housings H and A. Cooperating apertures in the extension 24 of plate 23 and in housing H receive a nipple 70 in which is mounted a ball check valve 71. An L-shaped conduit 72 is secured to nipple 70 and a coupling 73 secures a conduit or tubing 74 to tubing or conduit 72. The other end of conduit 74 is secured by a coupling 75 to a nipple 76 mounted in a passage 77 in wall 17, passage 77 thus communicating with the interior of gearing housing A.

Shaft S is threaded into rotatable nut N. Packing is placed in recess 52 and held therein by a slotted fiber thread follower or nut 80 mounted on shaft S. A pin 81 extends through follower 80 into a groove in nut N and is held against displacement by a set screw 82. Plug 16 is then removed and lubricant 83 placed in the jack, screw housing H acting as a lubricant reservoir.

In order to illustrate the operation of the invention, it will be described as applied to operate the retractable landing gear of an aircraft. The complete unit may be mounted on a hinged landing gear element, with lug L pivotally securing it to the element. The outer end of shaft or screw S is then pivotally and non-rotatably secured to a fixed portion of the aircraft adjacent the retractable gear. An electric cable for conducting operating current for power drive unit P is connected to a suitable remote control system operated by the pilot.

Assuming that the landing gear is in its extended or operative position, upon a suitable control impulse motor M and electromagnetic clutch E will be energized to rotate gearing G and nut N in a direction to retract screw shaft S into housing H. As shaft S enters housing H, it forces the lubricant 83 therein to enter housing A around nut N, lubricating the elements in the housing and flowing through apertures 55 around shaft S. During this movement, slotted thread follower or nut 80 will wipe foreign matter from shaft S to prevent such matter entering the assembly. When the landing gear is fully retracted, motor M and clutch E will be deenergized, and stop the ingress of screw S.

Upon energization of unit P to extend the landing gear, shaft S will be moved out of housing H. The suction thus created will cause lubricant to flow or aspire into housing H around nut N and through conduit means C, as indicated by arrows in Fig. 1, lifting ball check valve 71, which latter prevents reverse flow of lubricant 83 during retraction of shaft S. The conduit C thus acts as a supplemental path for return of lubricant to housing H.

The flexible shaft F may be connected to the gearing of other actuating mechanisms and/or to manual operating means. Thereby, in the event of failure of motor M or unit P, the jack J may be operated by the power units of other associated mechanisms, such as that operating the opposite landing gear; and/or jack J may be manually operated through rotation of flexible shafting F.

An important feature of the invention actuation is that it may be mounted as a unitary assembly directly with the device to be operated. This provides an integral assembly obviating the necessity of running a flexible operating cable into the aircraft to the pilot, reducing maintenance costs as well as decreasing the weight to be carried. Also, nut 80 wipes the shaft or screw S clean as it is retracted into housing H. The self-lubrication feature assures adequate lubrication of the screw threads and the gears, thus lengthening the life of these parts by reducing wear. Additionally, the combination of the rotatable nut and the screw is positive and reliable in operation, and the provision of the flexible shaft F provides for operation of the unit even if the power drive means P becomes inoperative.

While a specific embodiment of the invention has been illustrated and described as applied to the operation of aircraft landing gear, it will be understood that the principles of the invention are applicable to the operation of other aircraft accessories such as wing and cowl flaps, bomb bay doors, etc., and to more general applications; and that the invention may be otherwise embodied without departing from the principles thereof.

What is claimed is:

1. Actuating mechanism comprising, in combination, a gear housing; a threaded nut rotatably mounted in said housing; a tubular housing secured to said gear housing coaxially with said nut; a shaft threadedly engaging said nut and extendable into said tubular housing; power drive means; gearing in said gear housing operatively connecting said drive means to said nut, whereby said drive means is operative to rotate said nut to advance and retract said shaft relative to said tubular housing; said shaft upon movement relative to said tubular housing forcing lubricant from one housing to the other to lubricate said shaft, nut and gearing; and means operative upon movement of said shaft out of said tubular housing to provide a supplemental passage for lubricant into said tubular housing.

2. Actuating mechanism comprising, in combination, a gear housing; an internally threaded nut rotatably mounted in said housing; an elongated tubular housing secured to said gear housing coaxially with said nut; an externally threaded shaft threadedly engaging said nut and extendable into said elongated housing; power drive means secured to said gear housing; gearing in said gear housing operatively connecting said drive means to said nut, whereby said drive means is operative to rotate said nut to advance and retract said shaft relative to said tubular housing; said shaft upon movement relative to said tubular housing forcing lubricant from one housing to the other to lubricate said shaft, nut and gearing; said housings and drive means being united in a compact unit, and means operative upon movement of said shaft out of said tubular housing to provide a supplemental passage for lubricant into said tubular housing.

3. Actuating mechanism comprising, in combination, a gear housing; a nut rotatably mounted in said gear housing; an elongated tubular housing secured to said gear housing coaxially with said nut; a shaft threadedly engaging said nut and extending, in its retracted position, into said elongated housing; power drive means; gearing in said gear housing operatively connecting said drive means to said nut, whereby said drive means is operative to rotate said nut to advance and retract said shaft relative to said elongated housing; a conduit connecting said housings; a check valve in said conduit; said shaft, upon retraction into said elongated housing, forcing lubricant therefrom around said nut and gearing into said gear housing, and, upon advancing from said elongated housing, causing lubricant to be drawn thereinto around said nut and gearing and also through said conduit and past said check valve.

4. A self-lubricating screw jack comprising in combination, a gear housing; a nut rotatably mounted in said gear housing; an elongated tubular housing secured to and communicating with said gear housing coaxially with said nut; a shaft threadedly engaging said nut and extending, when retracted, into said elongated housing, a lubricant conduit external to and connecting said housings; a check valve in said conduit; means for rotating said nut to advance and retract said shaft relative to said elongated housing; said shaft upon retraction into said elongated housing, forcing lubricant therefrom directly into said gear housing, and, upon advancing from said elongated housing, drawing lubricant thereinto around said nut and gearing and also through said conduit and past said check valve; whereby effective lubrication of said shaft and nut is obtained.

5. A self-lubricating screw jack comprising in combination, a gear housing; a nut rotatably mounted in said gear housing; an elongated tubular housing secured to and communicating with said gear housing coaxially with said nut; a shaft threadedly engaging said nut and extending, when retracted, into said elongated housing, a lubricant conduit external to and connecting said housings; a check valve in said conduit; means for rotating said nut to advance and retract said shaft relative to said elongated housing; said shaft upon retraction into said elongated housing, forcing lubricant therefrom directly into said gear housing, and, upon advancing from said elongated housing, drawing lubricant thereinto around said nut and gearing and also through said conduit and past said check valve, whereby effective lubrication of said shaft and nut is obtained; and a slotted thread wiper mounted on said shaft and rotatable with said nut to remove foreign matter from said shaft as it is retracted into said elongated housing.

6. A self-lubricating screw jack comprising, in combination, a gear housing; a pair of roller bearing assemblies mounted in spaced relation in said housing; a nut rotatably mounted in said bearings; means restraining longitudinal movement of said nut relative to said bearing assemblies; an elongated housing secured to said gear housing coaxially with said nut; a screw threadedly engaging said shaft; power drive means operative to rotate said nut to retract and advance said screw into and out of said elongated housing; a conduit external to and connecting said housings and containing a check valve; said screw, upon retraction into said elongated housing, forcing lubricant therefrom into said gear housing to lubricate said screw and nut and, upon advancing from said housing, drawing lubricant thereinto around said nut and gearing and also through said conduit and past said check valve.

7. A self-lubricating screw jack comprising, in combination, a gear housing; a pair of roller bearing assemblies mounted in spaced relation in said housing; a nut rotatably mounted in said bearings; means restraining longitudinal movement of said nut relative to said bearing assemblies; an elongated housing secured to said gear housing coaxially with said nut; a screw threadedly engaging said shaft; power drive means operative to rotate said nut to retract and advance said screw into and out of said elongated housing; a conduit external to and connecting said housings and containing a check valve; said screw, upon retraction into said elongated housing, forcing lubricant therefrom into said gear housing to lubricate said screw and nut and, upon advancing from said housing, drawing lubricant thereinto around said nut and gearing and also through said conduit and past said check valve; a wiper nut mounted on said screw outside said gear housing and secured to said rotatable nut, said wiper nut, upon retraction of said screw, removing foreign matter from the threads thereof to prevent such matter entering said housings.

8. Actuating mechanism comprising, in combination, a power drive unit comprising an electric motor and an electromagnetic clutch; a gear housing secured to said clutch including a first wall formed with two spaced bearing recesses, a second wall secured to said first wall and formed with spaced bearing recesses each aligned with one of said bearing recesses in said first wall and a coverplate secured to said second wall; a roller bearing mounted in each of said bearing recesses forming two pairs of bearing assemblies; an elongated housing secured to said coverplate in co-axial alignment with one of said pairs of bearing assemblies; a shaft supported in said other pair of bearing assemblies; a nut rotatably mounted in said one pair of bearing assemblies and co-axially aligned with said elongated housing; gear means extending from said shaft and engaging said clutch with said nut; and a screw threadedly engaging said nut and arranged to be rotated to be retracted and advanced into and out of said elongated housing.

9. Actuating mechanism comprising, in combination, a power drive unit comprising an electric motor and an electromagnetic clutch; a gear housing secured to said clutch including a first wall formed with two spaced bearing recesses, a second wall secured to said first wall and formed with spaced bearing recesses each aligned with one of said bearing recesses in said first wall and a coverplate secured to said second wall; a roller bearing mounting in each of said bearing recesses forming two pairs of bearing assemblies; an elongated housing secured to said coverplate in co-axial alignment with one of said pairs of bearing assemblies; a shaft supported in said other pair of bearing assemblies; a nut rotatably mounted in said one pair of bearing assemblies and co-axially aligned with said elongated housing; gear means extending from said shaft and engaging said clutch with said nut; an anchoring lug closing the outer end of said elongated housing; a screw threadedly engaging said nut, said nut being rotated to retract and advance said screw into and out of said elongated housing; and a flexible shaft secured to said first-named shaft and operative to rotate said nut through said gear means upon failure of said electric motor.

10. Actuating mechanism comprising, in combination, a power drive unit comprising an electric motor and an electromagnetic clutch; a gear housing secured to said clutch including a first wall formed with two spaced bearing recesses, a second wall secured to said first wall and formed with spaced bearing recesses each aligned with one of said bearing recesses in said first wall and a coverplate secured to said second wall; a roller bearing mounted in each of said bearing recesses forming two pairs of bearing assemblies; an elongated housing secured to said coverplate in co-axial alignment with one of said pairs of bearing assemblies; a shaft supported in said other pair of bearing assemblies; a nut rotatably mounted in said one pair of bearing assemblies and co-axially aligned with said elongated housing; gear means extending from said shaft and engaging said clutch with said nut; and a screw threadedly engaging said nut and arranged to be retracted and advanced into and out of said elongated housing; a conduit external to and connecting said housings, a check valve in said conduit; said screw upon retraction, forcing lubricant from said elongated housing into said gear housing to lubricate said gears, nut and screw, and, upon advancing from said housing, drawing lubricant thereinto through said conduit past said check valve.

11. Actuating mechanism comprising, in combination, a power drive unit comprising an electric motor and an electromagnetic clutch; a gear housing secured to said clutch including a first wall formed with two spaced bearing recesses, a second wall secured to said first wall and formed with spaced bearing recesses each aligned with one of said bearing recesses in said first wall and a coverplate secured to said second wall; a roller bearing mounted in each of said bearing recesses forming two pairs of bearing assemblies; an elongated housing secured to said coverplate in co-axial alignment with one of said pairs of bearing assemblies; a shaft supported in said other pair of bearing assemblies; a nut rotatably mounted in said one pair of bearing assemblies and co-axially aligned with said elongated housing; gear means extending from said shaft and engaging said clutch with said nut; and a screw threadedly engaging said nut and arranged to be retracted and advanced into and out of said elongated housing; and a wiper nut mounted on said screw outside said gear housing and secured to said rotatable nut for removing foreign matter from said screw.

12. Actuating mechanism comprising, in combination, a power drive unit comprising an electric motor and an electromagnetic clutch; a gear housing secured to said clutch including a first wall formed with two spaced bearing recesses, a second wall secured to said first wall and formed with spaced bearing recesses each aligned with one of said bearing recesses in said first wall and a coverplate secured to said second wall; a roller bearing mounted in each of said bearing recesses forming two pairs of bearing assemblies; an elongated housing secured to said coverplate in co-axial alignment with one of said pairs of bearing assemblies; a shaft supported in said other pair of bearing assemblies; a nut rotatably mounted in said one pair of bearing assemblies and co-axially aligned with said elongated housing; gear means extending from said shaft and engaging said clutch with said nut; and a screw threadedly engaging said nut and arranged to be retracted and advanced into and out of said elongated housing; a conduit external to and connecting said housings, a check valve in said conduit; said screw upon retraction, forcing lubricant from said elongated housing into said gear housing to lubricate said gears, nut and screw, and, upon advancing from said housing, drawing lubricant thereinto through said conduit past said check valve; and a wiper nut mounted on said screw outside said gear housing and secured to said rotatable nut; said wiper nut, upon retraction of said screw, removing foreign matter from said screw and preventing the same entering said housings.

13. A forced circulation lubricating system, comprising in combination, a first housing, a member adapted to be moved in and out with respect to said first housing, bearing means for said member adjacent said housing, gearing for moving said member, a second housing for said gearing, means forming a fluid flow connection between said first and said second housings through said bearing means, a unidirectional fluid flow connection between said second and said first housing, whereby upon said member being moved into said first housing lubricant therein is displaced therefrom and forced into said second housing through said bearing means and upon said member being moved out of said first housing the lubricant is aspired from said second housing into said first housing through said bearing means and through said unidirectional flow connection.

14. A forced circulation lubricating system, comprising in combination, a first housing, a member adapted to be moved in and out with respect to said first housing, bearing means for said member adjacent said housing, gearing for moving said member, a second housing for said gearing adjacent said bearing means, means forming a fluid flow connection between said first and said second housings through said bearing means, a unidirectional fluid flow connection between said second and said first housing, whereby upon said member being moved into said first housing lubricant therein is displaced therefrom and forced into said second housing through said bearing means and upon said member being moved out of said first housing the lubricant is aspired from said second housing into said first housing through said bearing means and through said unidirectional flow connection.

WILLIAM P. LEAR.